United States Patent
Wakatani et al.

(10) Patent No.: US 8,938,592 B2
(45) Date of Patent: Jan. 20, 2015

(54) REPRODUCING DEVICE AND REPRODUCING METHOD

(75) Inventors: Shigeki Wakatani, Kanagawa (JP); Hiroshi Masuda, Kanagawa (JP)

(73) Assignee: Sony Corporation (JP)

(*) Notice: Subject to any disclaimer, the term of this patent is extended or adjusted under 35 U.S.C. 154(b) by 473 days.

(21) Appl. No.: 13/430,876

(22) Filed: Mar. 27, 2012

(65) Prior Publication Data

US 2012/0260048 A1 Oct. 11, 2012

(30) Foreign Application Priority Data

Apr. 7, 2011 (JP) ................................. 2011-085420

(51) Int. Cl.
G06F 12/00 (2006.01)
G06F 3/06 (2006.01)

(52) U.S. Cl.
CPC ............ *G06F 3/0611* (2013.01); *G06F 3/0659* (2013.01); *G06F 3/0673* (2013.01)
USPC ............................ 711/154; 707/705; 707/821

(58) Field of Classification Search
None
See application file for complete search history.

(56) References Cited

U.S. PATENT DOCUMENTS

2009/0128862 A1* 5/2009 Nolepa et al. ................. 358/402
2011/0197279 A1* 8/2011 Ueoka .............................. 726/24
2013/0054688 A1* 2/2013 Rourke et al. ................ 709/204

FOREIGN PATENT DOCUMENTS

JP 9-319523 A 12/1997

* cited by examiner

*Primary Examiner* — Matthew Bradley
*Assistant Examiner* — Daniel Tsui
(74) *Attorney, Agent, or Firm* — Lerner, David, Littenberg, Krumholz & Mentlik, LLP (57) ABSTRACT

A reproducing device includes: a storage unit in which data is accumulated; a program control unit controlling first and second programs respectively generating an acquisition request of the data accumulated in the storage unit and generating the acquisition request of the data, which is different from the first program; and a read control unit managing the data on a file basis, selecting one of first and second algorithms in which the file is read using a method suitable for reading the data by the first program and in which the file is read using a method suitable for reading the data by the second program based on storage position information of the file designated in the data acquisition request when the data acquisition request is inputted from the program control unit, and performing readout of the data from the storage unit based on the selected first or second algorithm.

6 Claims, 9 Drawing Sheets

REPRODUCING DEVICE AND REPRODUCING METHOD

CROSS-REFERENCE TO RELATED APPLICATION

The present application claims priority from Japanese Patent Application No. JP 2011-085420 filed in the Japanese Patent Office on Apr. 7, 2011, the entire content of which is incorporated herein by reference.

FIELD

The present disclosure relates to a reproducing device and a reproducing method reproducing audio data and video data, and particularly relates to a technique effectively reading data from a storage.

BACKGROUND

In related art, data such as video data and audio data accumulated in a storage is managed in units of "files" by a file system. The file system is installed in almost every operating system (hereinafter, referred to as "OS") as a standard, therefore, the file system installed in the OS as the standard is used in many cases.

Incidentally, types of data stored in the storage or types of applications instructing readout of data are increased in recent years. Accordingly, when the file system installed in the OS as the standard is used as it is, the response from the readout instruction until the data is actually read out is sometimes slower than the required response.

As a method of solving the above problem, it is disclosed, in JP-A-9-319523 (Patent Document 1), that recording/reproduction is controlled by using a file system capable of efficiently performing recording/reproduction of video signals independent of the file system included in the OS of a computer device.

SUMMARY

In the case where plural dedicated file systems specialized to applications described above are provided, it is requested that these systems can be switched when used. It is also requested that data read operation from the storage by the file system can be switched according to applications.

It is therefore desirable that the data read operation from the storage by the file system can be switched according to applications.

An embodiment of the present disclosure is directed to a reproducing device including a storage unit in which data is accumulated, a program control unit controlling a first program generating an acquisition request of the data accumulated in the storage unit and a second program generating the acquisition request of the data accumulated in the storage unit, which is different from the first program, and a read control unit managing the data accumulated in the storage unit on a file basis, selecting any one of a first algorithm in which the file is read using a method suitable for reading the data by the first program and a second algorithm in which the file is read using a method suitable for reading the data by the second program based on storage position information of the file designated in the data acquisition request when the data acquisition request is inputted from the program control unit, and performing readout of the data from the storage unit based on the selected first algorithm or the second algorithm.

Another embodiment of the present disclosure is directed to a reproducing method including accumulating data, controlling a first program generating an acquisition request of the accumulated data and a second program generating the acquisition request of the accumulated data which is different from the first program, managing the accumulated data on a file basis, and selecting any one of a first algorithm in which the file is read using a method suitable for reading the data by the first program and a second algorithm in which the file is read using a method suitable for reading the data by the second program based on storage position information of the file designated in the data acquisition request when the data acquisition request is inputted, and performing readout of the accumulated data based on the selected first or second algorithm.

It is possible to switch the first algorithm for the first program and the second algorithm for the second program by using storage position information designated in the data acquisition request as information for decision making by applying the above configuration and processing.

The data read operation from the storage by the file system can be switched according to applications by applying the reproducing device and the reproducing method according to the embodiments of the present disclosure.

DETAILED DESCRIPTION

Hereinafter, a reproducing device and a reproducing method according to an embodiment of the present disclosure will be explained with reference to the drawings in the following order. The present disclosure is not limited to the following examples.

1. Configuration Example of Reproducing Device
2. Configuration Example of Read Control Unit
3. Example of Processing of Read Control Unit <1. Configuration Example of Reproducing Device>

Figure 1:
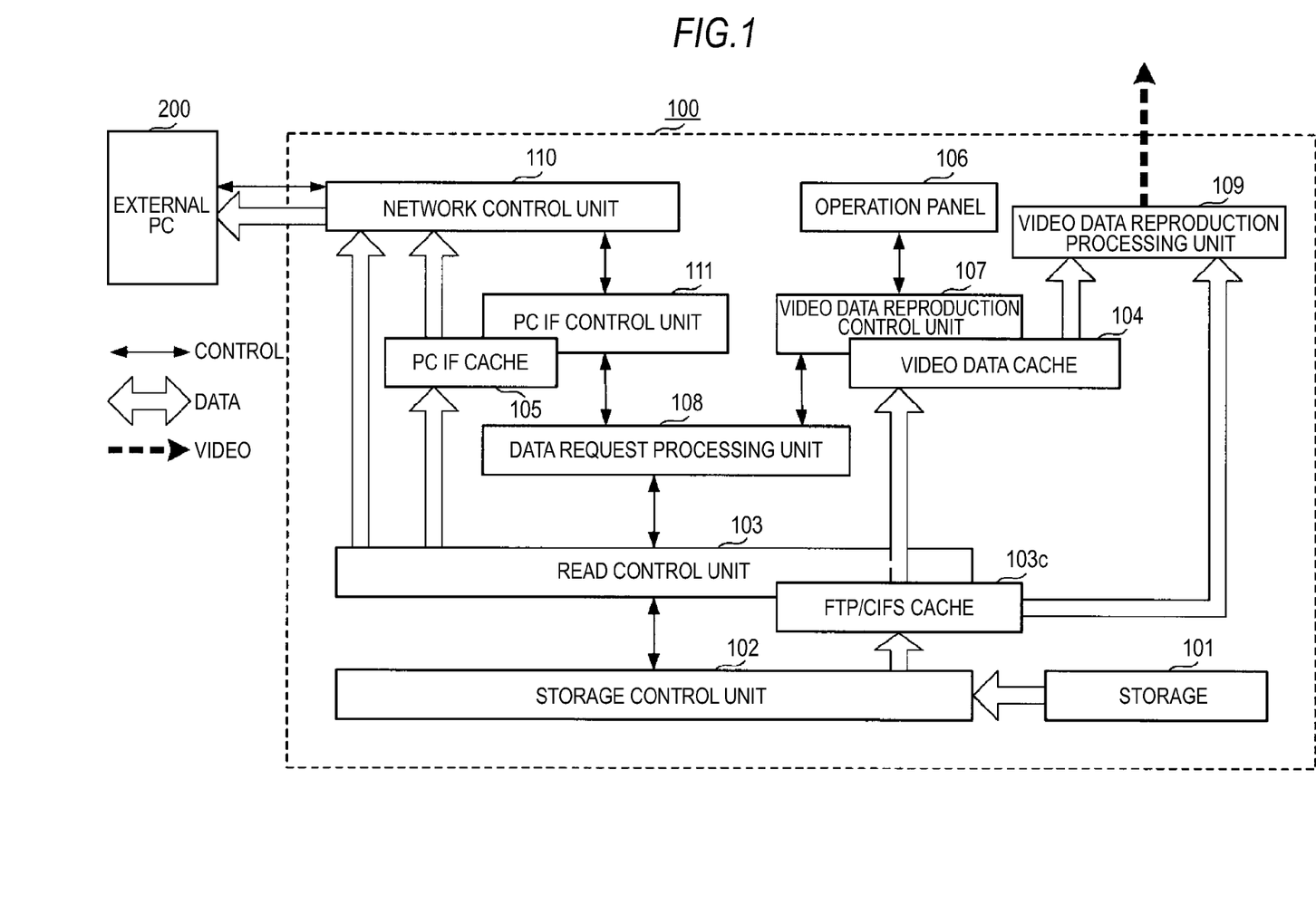
FIG. 1 is a block diagram showing an internal configuration example of a reproducing device according to an embodiment of the present disclosure.

FIG. 1 is a block diagram showing a configuration example of a reproducing device according to an embodiment of the present disclosure. A reproducing device 100 shown in FIG. 1 includes a storage 101 as a storage unit, and digitalized AV data is stored in the storage 101. The storage 101 is formed by a SSD (Solid State Drive), an HDD (Hard Disc Drive), an optical disc drive and so on.

The reproducing device 100 is connected to an external PC (Personal Computer) 200 as an external device through a network. The storage 101 is configured to be usable also as a network drive for the external PC. The configuration in which the storage 101 can be used also as the network drive for the external PC is realized by applications such as "Samba". When file sharing is set in an arbitrary directory of the reproducing device 100 by using Samba, the external PC 200 can access the directory to read/write the file.

On the external PC 200, for example, an application for non-linear editing is mounted, and a data acquisition request is transmitted to the reproducing device 100 based on editing work by the application. A file transfer request by FTP (File Transfer Protocol) is also transmitted from the external PC 200.

The reproducing device 100 further includes a storage control unit 102, a read control unit 103, a video data cache 104 and a PC IF (interface) cache 105. The storage control unit 102 functions as a device driver, actually operating the storage 101 to read data from the storage 101. The read control unit 103 functions as a file system, generating a read request for instructing reading of a file in accordance with the data acquisition request and transmitting the generated read request to the storage control unit 102. The read control unit 103 temporarily writes data read out from the storage 101 by the storage control unit 102 in a FTP/CIFS cache 103c. The data stored in the FTP/CIFS cache 103c is read in accordance with the data acquisition request from a later-described data request processing unit 108 and outputted to the video data cache 104 or the PC IF (interface) cache 105.

Data read out from the storage 101 in accordance with the data acquisition request by the external PC 200 is written in the video data cache 104. Data read out from the storage 101 in accordance with the data acquisition request inputted through a later-described operation panel 106 is written in the PC IF cache 105.

Not only the data acquisition request and the data transfer request but also a data write request is made by the external PC 200. Data requested to be written is written in the storage 101 under control by a not-shown write control unit. At this time, data written by using the function of "Samba" is stored as a file under a directory of "CIFS (Common Internet File System)". "CIFS" is a protocol providing a file sharing service applied in Samba. The data written by FTP is stored under a directory of "FTP".

In the reproducing device 100 according to the embodiment of the present disclosure, data read operation from the storage 101 by the read control unit 103 (file system) is switched according to applications of a transmission source of the data acquisition request. That is, the data read operation of the file system is switched between a case where the data acquisition request is inputted by using the function provided by Samba and a case where the data transfer request is made by FTP. The detailed configuration and operation of the read control unit 103 will be explained with reference to FIG. 2 and subsequent drawings.

Let us continue to explain the configuration of the reproducing device 100 shown in FIG. 1. The reproducing device 100 includes the operation panel 106, a video data reproduction control unit 107, a data request processing unit 108 and a video data reproduction processing unit 109. The operation panel 106 includes an input unit such as buttons from which a user operation is inputted and a display unit such as a display panel displaying a menu and so on. When receiving an operation input from the user, the content of the input is transmitted to the video data reproduction control unit 107 as an operation command. The video data reproduction control unit 107 interprets the operation command transmitted from the operation panel 106 and replaces the command with a specific operation. Then, the video data reproduction control unit 107 generates a request such as the data acquisition request based on the content of the replaced operation and transmits the request to the data request processing unit 108.

The data request processing unit 108 adjusts the request inputted from the video data reproduction control unit 107 and a request inputted from a later-described PC IF control unit 111 and transmits the request to the read control unit 103. The request transmitted to the read control unit 103 is made by using system calls provided by OS as a standard. Specifically, the request is made by using an open-system call, a read system call and a pread system call. The video data reproduction processing unit 109 performs D/A conversion on video data directly read out from the storage 101 based on video data stored in the video data cache 104 or under control of the read control unit 103 and outputs an obtained video data.

The reproducing device 100 further includes a network control unit 110 and the PC IF control unit 111. The network control unit 110 controls communication with respect to the external PC 200. The network control unit 110 also transmits data directly read out from the storage 101 to the external PC 200 based on data written in the PC IF cache 105 or under control of the read control unit 103.

In the PC IF control unit 111, a program (first program) called "ftpd" realizing data transfer by FTP and a program (second program) called "Samba" providing the file sharing service are stored. Then, the PC IF control unit 111 interprets the command transmitted from the external PC 200 through a network and replaces the command with a specific operation. Then, the PC IF control unit 111 generates requests such as a data acquisition request and data transfer request based on the content of the replaced operation, and transmits the request to the data request processing unit 108. The PC IF control unit 111 also reads data actually read out from the storage 101 under control of the read control unit 103 and written in the PC IF cache 105 and outputs the data to the network control unit 110.

<2. Configuration Example of Read Control Unit>

Next, a configuration example of the read control unit 103 will be explained with reference to FIG. 2. The read control unit 103 includes a virtual file system 1031 (hereinafter, referred to as a VFS 1031), a file system control unit 1032, a FTP reader 1033 and a CIFS reader 1034.

When the system call is generated by the data request processing unit 108 (see FIG. 1) based on the data acquisition/transfer request from the ftpd program or the Samba program, the VFS 1031 transmits the content of the system call to the file system control unit 1032. The VFS 1031 also manages information of a file called by the open system call so as to be associated with a value of an obtained file descriptor. Hereinafter, data in which values of file descriptors are associated with file information is referred to as a "management table". The file information managed in the management table includes items, for example, storage position information of a file entity, a file name, a file size, time information such as a file generation date, an offset address obtained when the file was accessed last time and so on.

The "storage position information of the file entity" is managed by an absolute pass name from a root directory. For example, the storage position information of the file stored in the storage 101 by using the file sharing service provided by "Samba" is shown as "/CIFS/clip1. MXF". The storage position information of the file written in the storage by the file transfer by the FTP is shown as "/FTP/clip2. MXF".

The "offset address obtained when the file was accessed last time" shows a logical position of the file at the time of actually performing reading based on the data read request from the data request processing unit 108.

Additionally, a write position (write point) and a read position (read point) of the file on the FTP/CIFS cache 103c (see FIG. 1) are also managed as file information. The "write point" indicates a write position on a buffer at the time of writing the file in the FTP/CIFS cache 103c. When a value is written in the write point, it means that some kind of file is written in the FTP/CIFS cache 103c. The "read point" indicates a read position on a buffer at the time of reading the file from the FTP/CIFS cache 103c.

Figure 3:
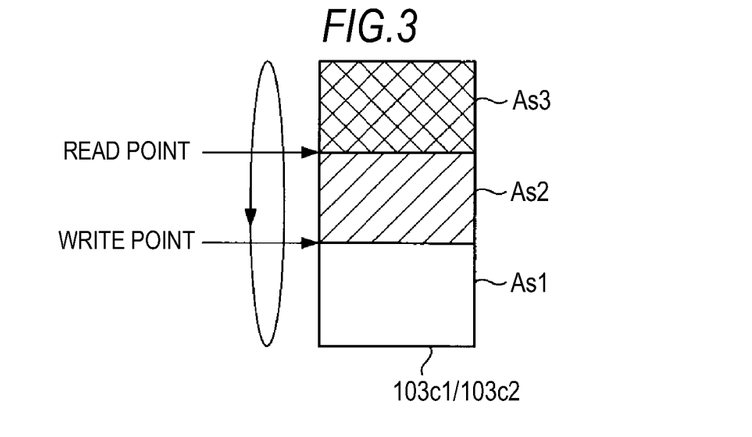
FIG. 3 is an explanatory view showing an example of a method of managing a cache space according to the embodiment of the present disclosure.

It is possible to manage free space in the FTP/CIFS cache 103c by updating the "write point" and the "read point" every time the writing into the cache or the reading from the cache is performed. FIG. 3 is a view showing an address space of the FTP/CIFS cache 103c. The example shown in FIG. 3 shows an image in which the read point and the write point move in the vertical direction shown by a ring arrow in the address space shown in a square shape. In the address space shown in the square shape, the address is increased as coming downward. The read point where the reading was actually performed follows and moves so as to get after the write point where the writing was actually performed.

An address space As1 which is below the write point is managed as a space where writing of a file has not been performed, namely, as a free space. An address space As2 with hatched lines which is sandwiched by the write point and the read point is managed as a space where the file has been written but has not been read out. An address space As3 with mesh lines which is above the read point is managed as a free space where data has been read out even when data is actually stored.

Figure 2:
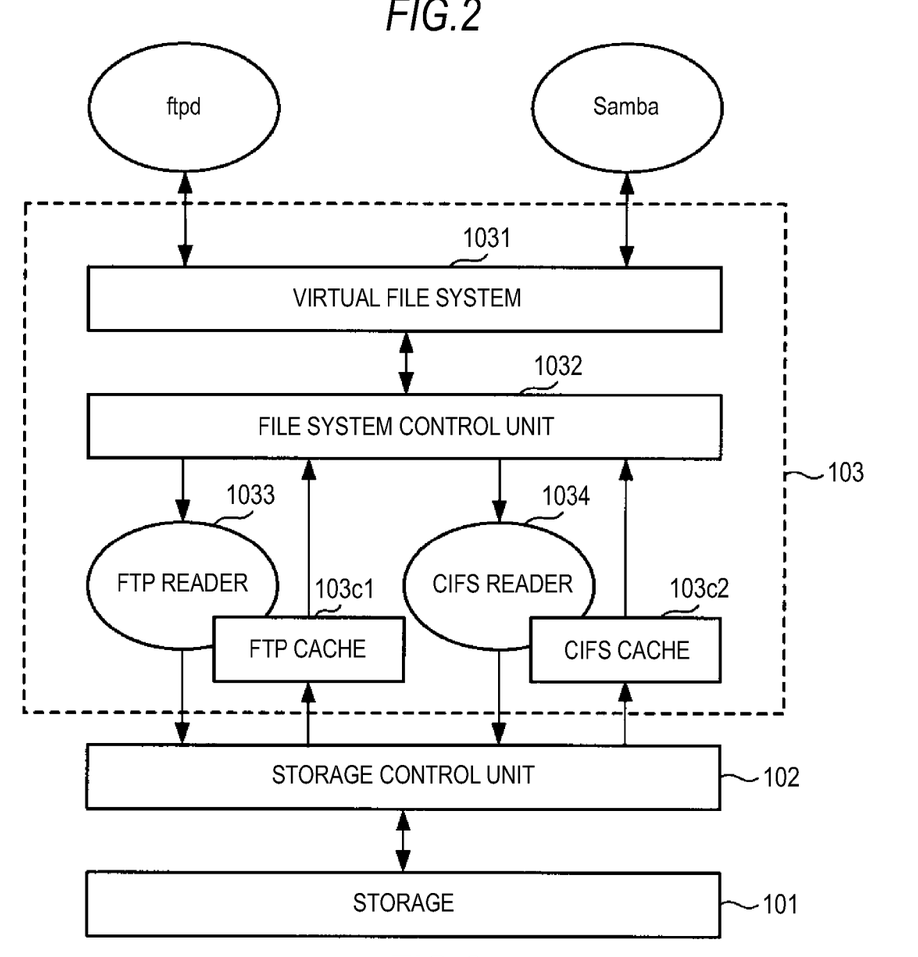
FIG. 2 is a block diagram showing a configuration example of a read control unit according to the embodiment of the present disclosure.

Let us continue to make explanation of FIG. 2. As an item managed as file information in addition to the above respective items, there is algorithm information for fixing the actual read operation of data from the storage 101. As algorithms, an algorithm (first algorithm) for the case where the data transfer request is made by FTP and an algorithm (second algorithm) for the case where the data acquisition request is inputted by using the function provided by Samba are prepared. In FIG. 2, a function of reading data from the actual storage 101 based on the first algorithm is shown as a "FTP reader 1033". Similarly, a function of reading data from the storage 101 based on the second algorithm is shown as a "CIFS reader 1034".

The file system control unit 1032 functions as a file system driver. That is, the file system control unit 1032 generates a read request in which a physical address is designated on the storage 101 of the file in accordance with the system call inputted from the data request processing unit 108 (see FIG. 1) to transmit the request to the storage control unit 102. Specifically, any one of the first algorithm for FTP and the second algorithm for Samba is selected by using a path name of the file designated in the system call as information for decision making to thereby generate the read request based on the selected algorithm. For example, when the path name designated in the system call starts with "/CIFS/", the "CIFS reader 1034" performing reading based on the second algorithm is selected. When the path name designated in the system call starts with "/FTP/", the FTP reader 1033 performing reading based on the first algorithm is selected.

The file read out from the storage 101 by the FTP reader 1033 is written in the FTP cache 103c1 and the file read out from the storage 101 by the CIFS reader 1034 is written in the CIFS cache 103c2.

<3. Example of Processing of Read Control Unit>

[3-1. Processing at the Time of Executing the Open System Call]

Figure 4:
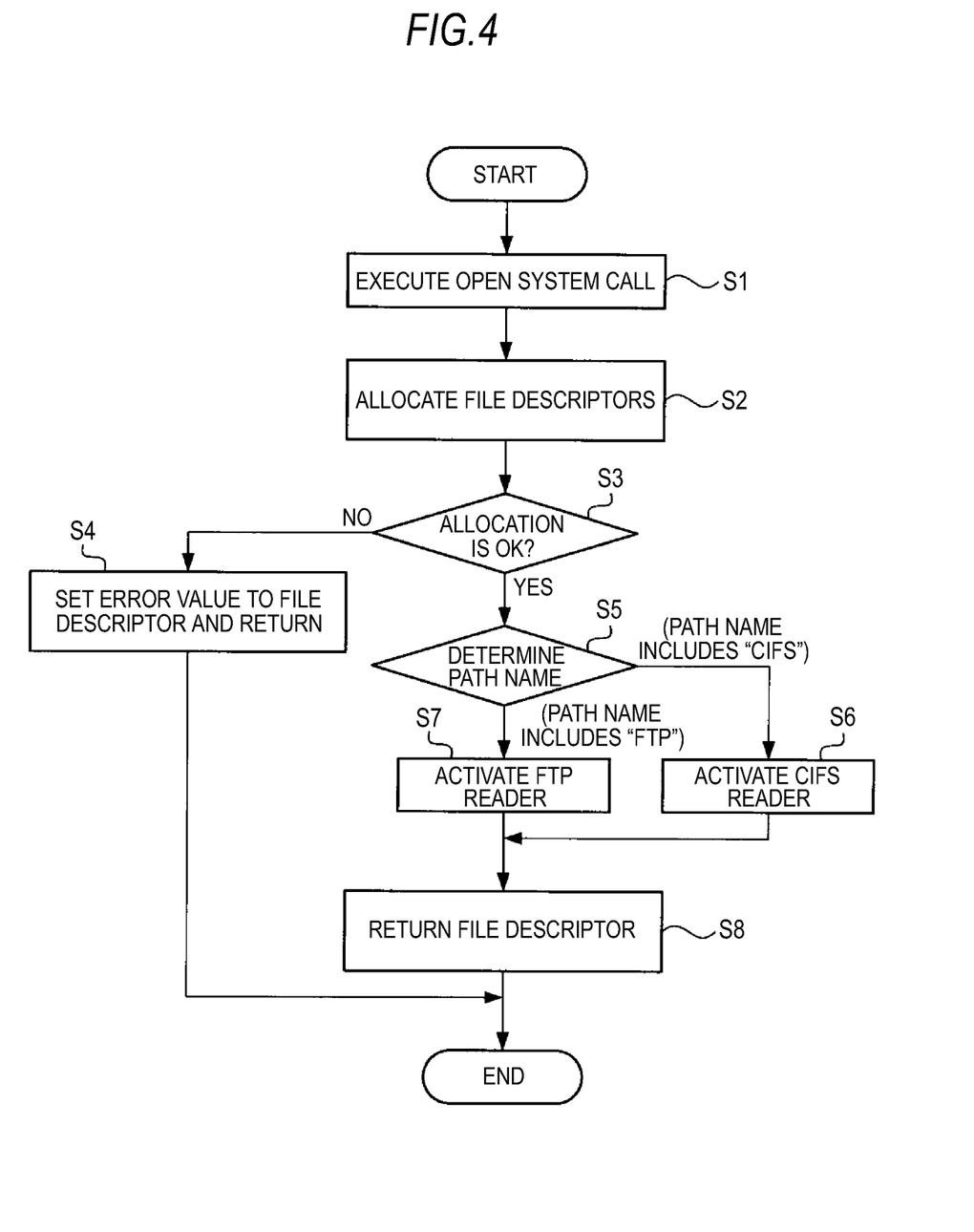
FIG. 4 is a flowchart showing an example of control in the read control unit at the time of executing an open system call according to the embodiment of the present disclosure.

Next, a processing example by the read control unit 103 will be explained with reference to FIG. 4 to FIG. 10. FIG. 4 is a flowchart showing a processing example by the read control unit 103 when the open system call is received from the data request processing unit 108 (see FIG. 1). The open system call is written as "fd=open (a path name of the file)". When the open system call is executed, a file descriptor "fd" of the file having the designated file name is acquired.

First, the read control unit 103 executes the open system call (Step S1), then, performs allocation of file descriptors (Step S2). Subsequently, the read control unit 103 determines whether the allocation of the file descriptors has been completed or not (Step S3), and if the allocation has not been completed, an error value is set to a value of the file descriptor and returned (Step S4).

Next, when it is determined that the allocation of file descriptors has been completed in Step S3, determination of the path name designated in the open system call is made (Step S5). In the case where the path name includes "CIFS", the CIFS reader 1034 (see FIG. 2) is activated (Step S6). In the case where the path name includes "FTP", the FTP reader 1033 is activated (Step S7). Then, the acquired value of the file descriptor is set to the variable "fd" and returned (Step S8).

Though not shown in the flowchart of FIG. 4, the read control unit 103 also acquires information of the file indicated by the path name in the open system call from the storage 101 when the file descriptor can be acquired. Then, the read control unit 103 writes the acquired file information in the not-shown management table so as to be associated with the file descriptor returned in Step S8.

[3-2. Data Read Processing Based on the Data Transfer Request by FTP]

Figure 5:
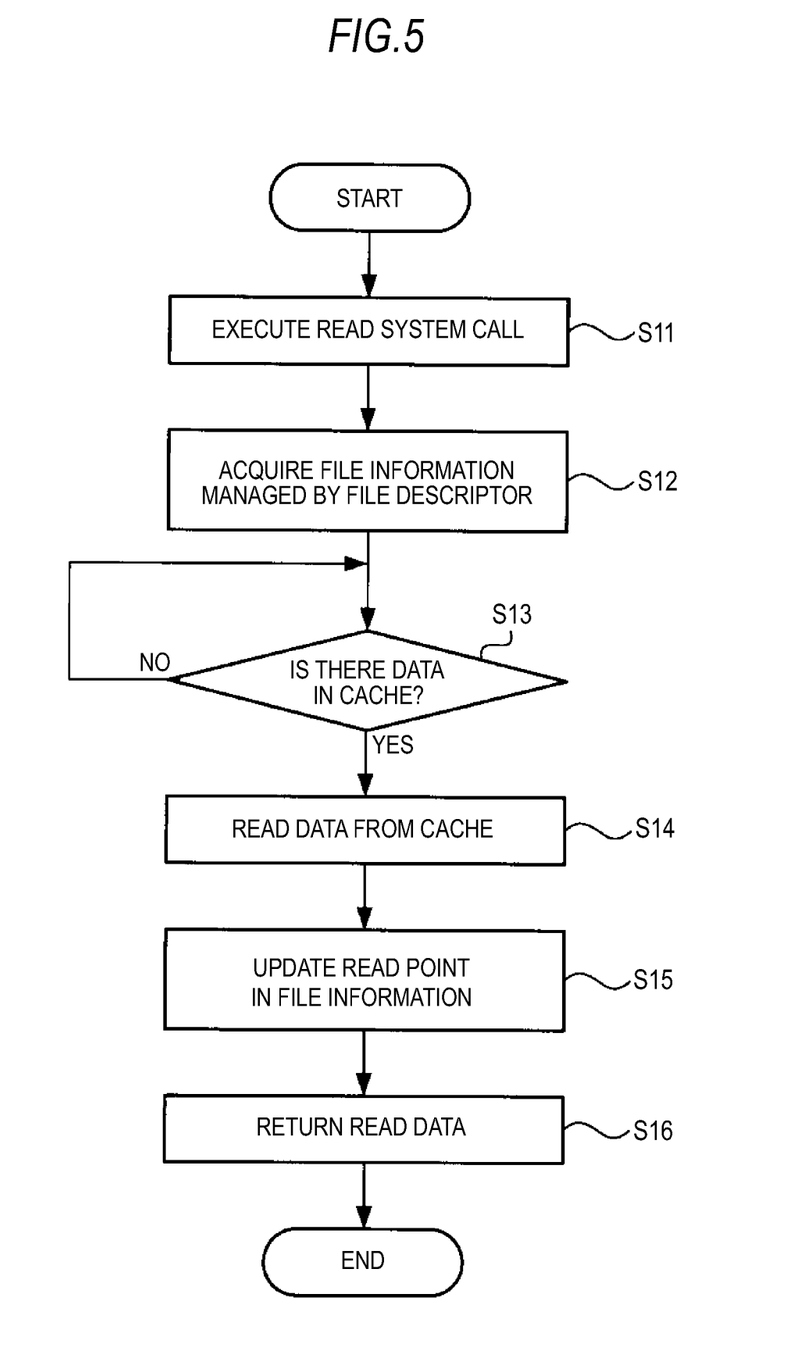
FIG. 5 is a flowchart showing an example of read processing from the cache by the read control unit performed when a FTP reader is selected according to the embodiment of the present disclosure.

FIG. 5 is a flowchart showing a processing example by the read control unit 103 performed when a read system call is data-inputted followed by the open system call from the data request processing unit 108 (see FIG. 1). The processing shown in FIG. 5 is performed when the path name designated by the open system call includes "FTP". First, the read control unit 103 executes the read system call (Step S11), then, acquires file information managed so as to be associated with the file descriptor acquired by the open system call (Step S12). Then, whether data is stored in the FTP cache 103c1 (see FIG. 2) or not is determined based on the obtained file information (Step S13). Specifically, determination is made based on the "read point" and the "write point" (see FIG. 3) in the file information.

When it is determined that there is no data in the FTP cache 103c1, the determination of Step S13 is repeated. That is, the read control unit 103 waits until the data is transferred from the external PC 200 by FTP and the transferred file is written in the FTP cache 103c1. When it is determined that there is data in the FTP cache 103c1, the data is read from the FTP cache 103c1 (Step S14) and the value of the "read point" in the file information is updated (Step S15). Then, the read data is returned as a "returned value" (Step S16).

Figure 6:
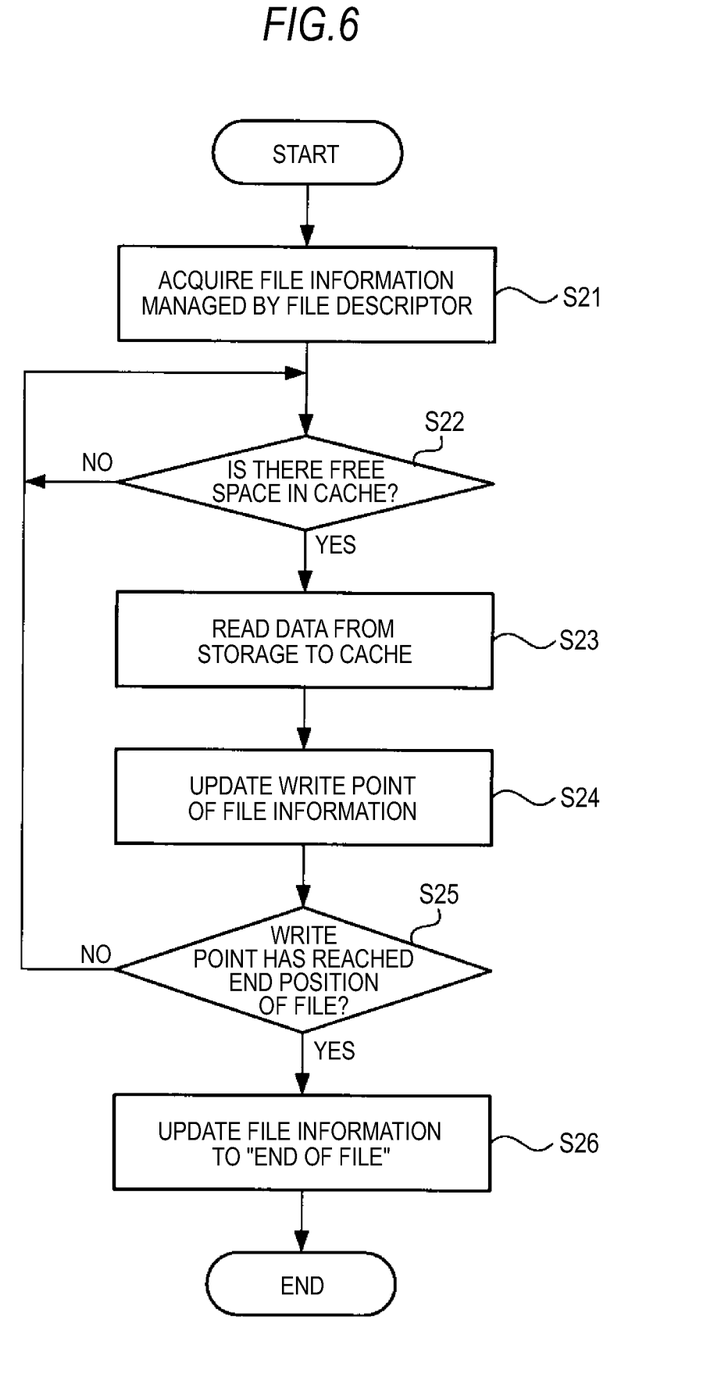
FIG. 6 is a flowchart showing an example of read processing from a storage by the read control unit performed when the FTP reader is selected according to the embodiment of the present disclosure.

Subsequently, an example of file reading processing by the FTP reader 1033 (see FIG. 2) will be explained with reference to FIG. 6. First, the FTP reader 1033 acquires file information managed so as to be associated with the file descriptor acquired by the open system call (Step S21). Then, whether there is free space in the FTP cache 103c1 or not is determined based on the acquired file information (Step S22). When it is determined that there is no free space in the FTP cache 103c1, the determination of Step S22 is performed repeatedly.

When it is determined that there is free space in the FTP cache 103c1, data is read from the storage 101 to the FTP cache 103c1 (Step S23), and the write point in the file information is updated based on the read position (Step S24). Subsequently, whether the position (write point) where the writing is performed in the FTP cache 103 reaches an end position of the file or not (Step S25). When it is determined that the position has reached the end position of the file, the "write point" in the file information is updated to "End Of File" (hereinafter referred to as "EOF") and processing ends. When it is determined that the position has not reached the end position of the file, the process returns to Step S22 and determination is continued.

That is, the FTP reader 1033 reads the file from the storage 101 immediately after the execution of the open system call and writes the file in the FTP cache 103c1 regardless of existence of issue of the read system call. That is, data readout from the storage 101 based on the data transfer request by FTP is performed by a sequential access.

Figure 7:
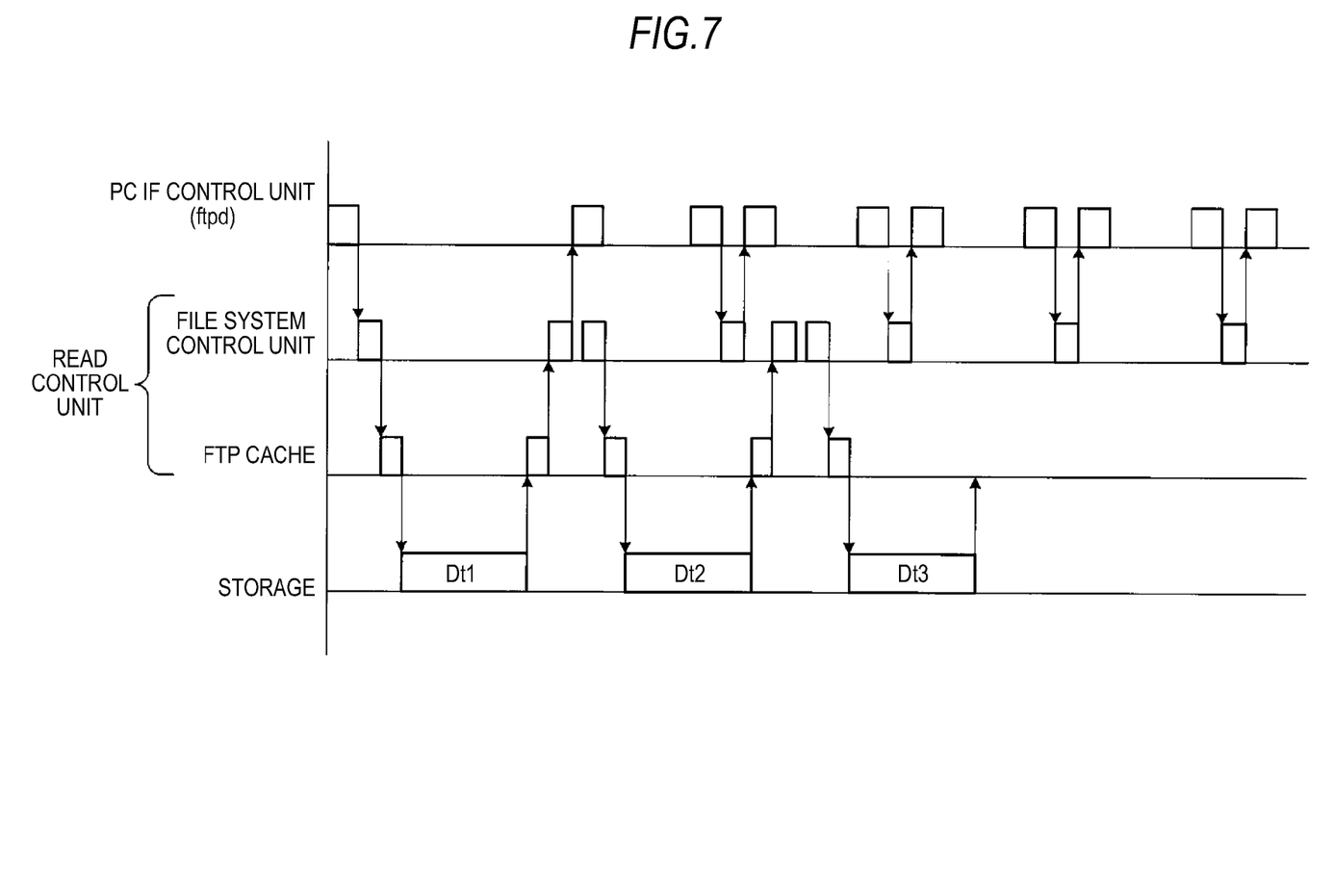
FIG. 7 is an explanatory diagram showing an example of data read processing performed in accordance with the data acquisition request by "ftpd" according to the embodiment of the present disclosure.

FIG. 7 shows an example of data read processing performed when file transfer using FTP is requested by the external PC 200. In FIG. 7, the horizontal axis indicates the time, and rectangles shown in respective processing blocks indicate processing time in respective blocks. The processing time indicates, for example, a period of time during which the data read request transmitted from a high-order block is converted into the data read request with respect to a low-order block, a period of time which is necessary when data outputted from a low-order block is returned to a high-order block and so on. Arrows indicate directions in which the read request is transmitted to the low-block and directions in which data read from the storage 101 is transmitted to the high-order block.

The data readout from the storage 101 based on the file transfer request by FTP is performed by the sequential access as described above. Therefore, read-ahead will be effective. Accordingly, as shown in FIG. 7, the size of data Dt1 to data Dt3 read out from the storage 101 are set to be relatively large. Large data is read out from the storage 101, and when the read request is performed from the PC IF control unit 111, data is read out from the FTP cache 103c1, thereby improving the readout response. The number of accesses with respect to the storage 101 can be reduced by performing processing as described above, therefore, other tasks executed as multitasking can access to the storage 101 while the storage 101 is not accessed. That is, the use efficiency of the storage 101 is improved.

The file system control unit 1032 in the read control unit 103 generates a read request instructing data readout from the storage 101 even when the read request is not transmitted from the high-order PC IF control unit 111. Then, the generated read request is transmitted to the FTP cache 103c1. The processing is shown in FIG. 7 as second and third arrows from the left of arrows extending downward from the file system control unit 1032 to the FTP cache 103c1. That is, instruction is made so that data is read from the storage 101 to the FTP cache 103c1 as the read-ahead data. The data readout suitable for the file transfer by FTP is executed by the FTP reader 1033 (FIG. 2).

In the example shown in FIG. 7, it is desirable that the data size to be read out from the storage 101 is set to be relatively large, however, it is also preferable to apply a method of gradually increasing the size, not setting the size to be large from the first readout. When an offset address at which readout is instructed by the read request is not continued from an offset address accessed last time, it is preferable to perform readout by the above method. When the offset addresses are not continuous, it is difficult to use data stored in the CIFS cache 103c2 for the read-ahead. Therefore, a period of time during which data is read out from the storage 101 will be directly delay time of the readout response. As the period of time during which data is read out from the storage 101 is in proportion to the data size, it is preferable to set the readout size to be smaller for speeding up the response.

As each readout size to be gradually increased, the maximum size which can be read out from the storage 101 until the PC IF cache 105 (see FIG. 1) is depleted is preferably applied. The following method can be considered as a method of calculating the readout size. First, on the calculation of the readout size of data, assume that readout speed of the read control unit 103 is "x", the file size read by the read control unit 103 is "S" and a period of time during which the network control unit 110 reads out data having the size "S" is "T". Additionally, assume that the number of frames at the time of reading out data for the n-th time from the storage 101 by the read control unit 103 is "j", and the number of frames at the time of reading out data for the (n-1)th time is "i".

In this case, the number of frames "j" read out for the n-th time is set to a value satisfying the following two expressions.

$$T(j) < S(i)/x \tag{1}$$

$$j > i \tag{2}$$

That is, according to Expression (1), the number of frames "j" read out for the n-th time is set to a value in which the time T(j) during which the read control unit 103 reads j-frames will be smaller than a value obtained by dividing data S(i) for i-frames by the time x read out by the network control unit 110. According to the calculation, it is possible to calculate the data size which can be read out from the storage 101 by the read control unit 103 until the read control unit 103 reads all data stored in the PC IF cache 105. Furthermore, according to Expression (2), as the number of frames 'j' calculated by Expression (1), larger values than the number of frames "i" which has been already read are narrowed down. As described above, the data size read out from the storage 101 will be gradually increased from a small size by determining the readout size and performing readout by the determined size in the above manner.

[3-3. Data Read Processing Based on the Data Transfer Request Performed by Using the Function of Samba]

Figure 8:
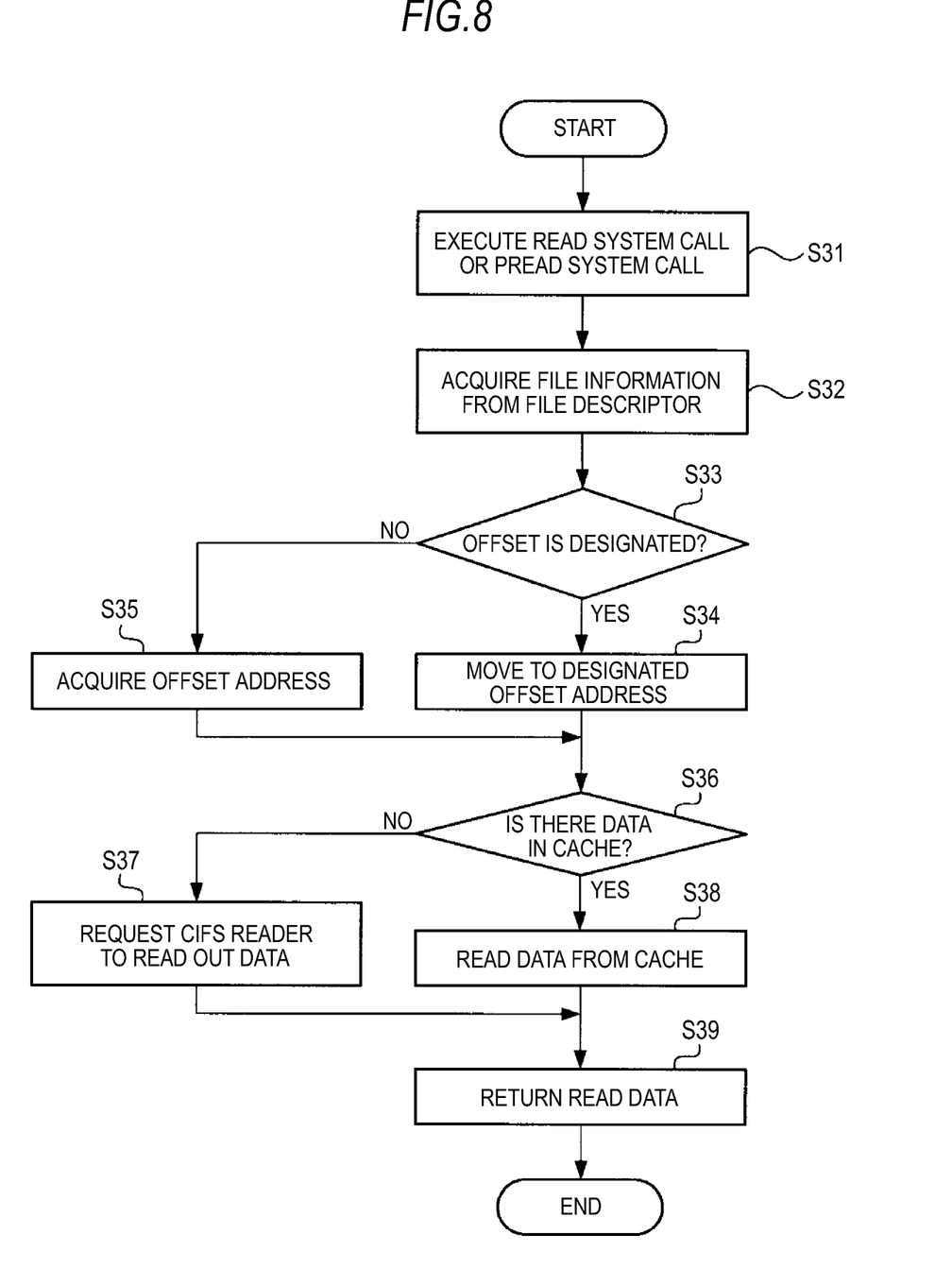
FIG. 8 is a flowchart showing an example of read processing from the cache by the read control unit performed when a CIFC reader is selected according to the embodiment of the present disclosure.

FIG. 8 is a flowchart showing a processing example by the read control unit 103 performed when the read system call is data-inputted followed by the open system call by the data request processing unit 108 (see FIG. 1). The processing shown in FIG. 8 is performed when the path name designated by the open system call includes "CIFS".

First, the read control unit 103 executes the read system call or the pread system call (Step S31), then, acquires file information managed so as to be associated with the file descriptor acquired by the open system call (Step S32). Then, whether the offset is designated in the system call or not is determined (Step S33). That is, whether the executed system call is the read system call or the pread system call is determined. The pread system call is a system call for instructing the reading of data of the designated number of bytes in the buffer from the offset at the head of the file managed by the file descriptor "fd".

When the offset is designated, namely, when the pread system call is executed, the position is moved to a position moved from the head of the file by the designated offset (the position is hereinafter referred to as a "designated offset address")(Step S34). When the offset is not designated, namely, when the read system call is executed, "offset address" is acquired from the file information (Step S35).

Subsequently, whether there is data in the CIFS cache 103c2 or not is determined (Step S36), and when data is not accumulated, the read control unit 103 requests the CIFS reader 1034 to read out data from the storage 101 (Step S37). When there is data in the CIFS cache 103c2, data is read out from the CIFS cache 103c2 (Step S38), the read data is returned as a returned value (Step S39).

Figure 9:
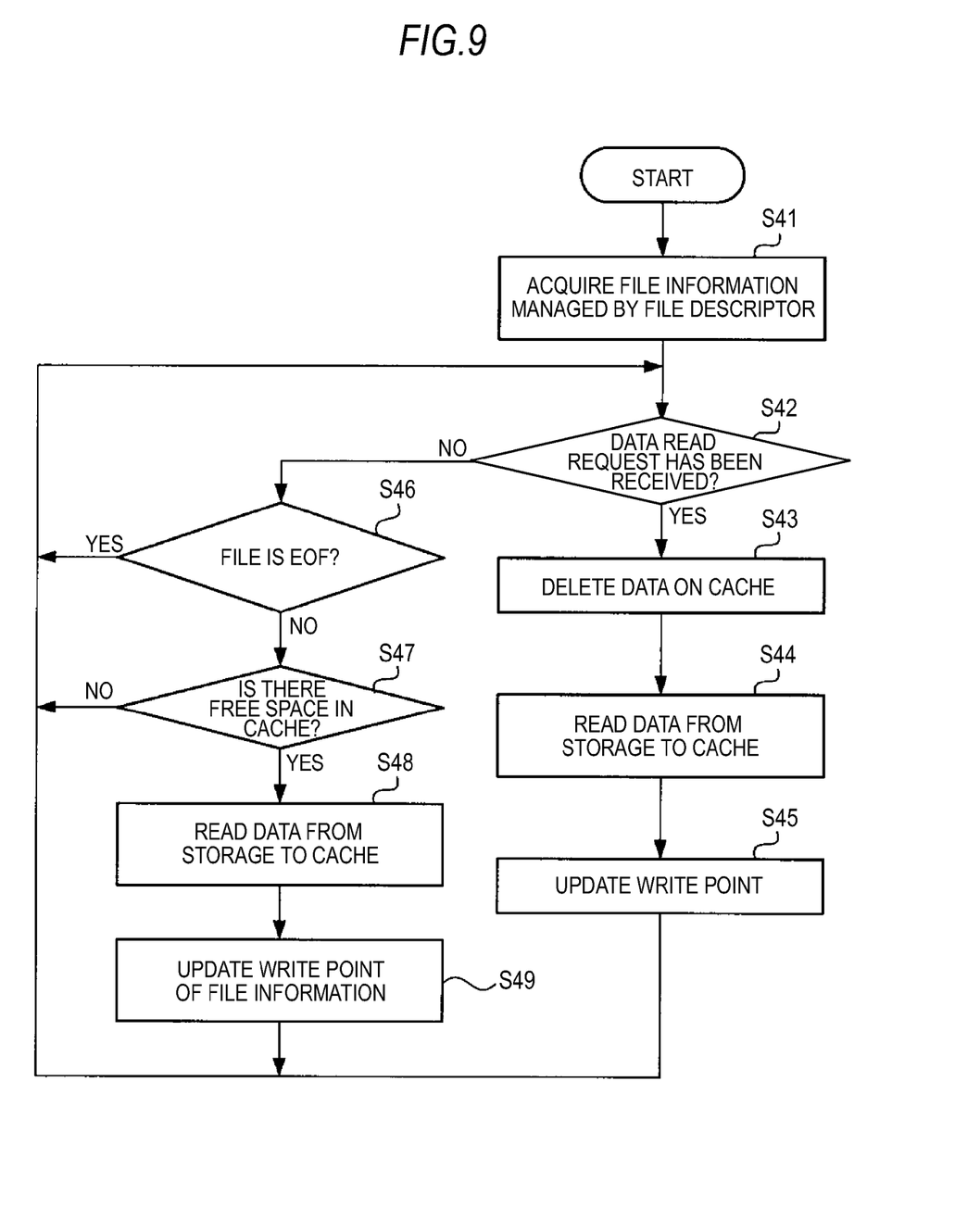
FIG. 9 is a flowchart showing an example of read processing from the cache by the read control unit performed when the CIFC reader is selected according to the embodiment of the present disclosure.

FIG. 9 is a flowchart showing an example of file read processing by the CIFS reader 1034 (see FIG. 2). First, the CIFS reader 1034 acquires file information managed so as to be associated with the file descriptor acquired by the open system call (Step S41). Subsequently, whether the data read request has been received or not from the file system control unit 1032 (see FIG. 2) is determined (Step S42). That is, whether the read system call or the pread system call has been executed or not is determined.

When it is determined that the data read request has been received, the read control unit 103 deletes data on the CIFS cache 103c2 (Step S43) and reads data from the storage 101 to the CIFS cache 103c2 (Step S44). Then, the "write point" in the file information is updated (Step S45). When it is determined that the data read request has not been received, the read control unit 103 determines whether the file information is "EOF" or not (Step S46). That is, whether the "write point" on the CIFS cache 103c2 reaches "EOF" or not is determined.

When the file information is "EOF", the process returns to Step S42 and the determination is repeated. When the file information is not "EOF", whether there is free space in the CIFS cache 103c2 or not is determined (Step S47). When it is determined that the there is no free space in the CIFS cache 103c2, the process returns to Step S42 and the determination is repeated. When it is determined that there is free space in the CIFS cache 103c2, the read control unit 103 reads data from the storage 101 to the CIFS cache 103c2 (Step S48) and updates the "write point" in the file information (Step S49). The processing after Step S47 corresponds to the explanation of accumulation processing of data to the CIFS cache 103c2 by the read-ahead.

That is, the CIFS reader 1034 reads data from the storage 101 at the timing of receiving the data read request and writes the data in the CIFS cache 103c2. The read request is performed through the file sharing service provided by Samba, therefore, the file whose readout is designated differs in each case. Therefore, data readout from the storage 101 is performed at random access.

Figure 10:
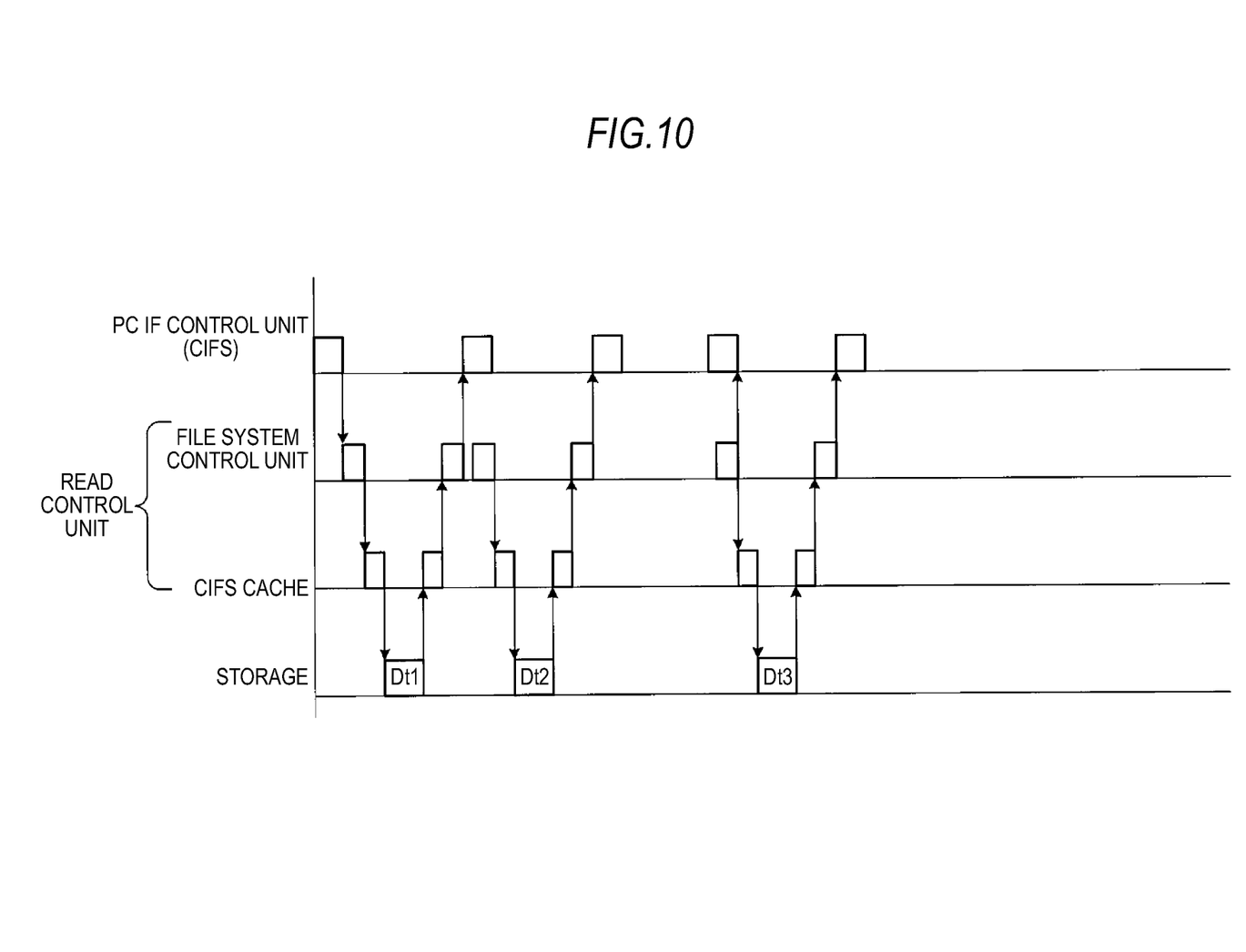
FIG. 10 is an explanatory diagram showing an example of data read processing performed in accordance with the data acquisition request by "Samba" according to the embodiment of the present disclosure.

FIG. 10 shows an example of data read processing performed when readout of the file through the file sharing service provided by Samba is requested by the external PC 200. In FIG. 10, the horizontal axis indicates the time, and rectangles shown in respective processing blocks indicate processing time in respective blocks.

The data readout performed when readout of the file is requested through the file sharing service provided by Samba is performed by random access as described above. Therefore, it is important that data is quickly read in response to the request (quick response is important). Accordingly, the size of data Dt1 to data Dt3 read from the storage 101 is set to be smaller as shown in FIG. 10.

As shown by the second arrow from the left of arrows extending downward from the file system control unit 1032 to the CIFS cache 103c2, instruction of reading data to the CIFS cache 103c2 as read-ahead is also made. However, it is highly likely that the offset address designated to be accessed next time is not continued from the address read to the CIFS cache 103c2 this time, therefore, data size read as read-ahead is set to be small. The data readout suitable for the data read request performed through the file sharing service provided by Samba is executed by the CIFS reader 1034 (FIG. 2).

According to the above embodiment, any one of the first algorithm for FTP and the second algorithm for Samba is selected by using the path name of the file designated in the system call as information for decision making to thereby read out data in accordance with the selected algorithm. That is, two algorithms for fixing read operation by the file system, which are creased for specific applications can be switched when used.

The switching of algorithms is performed by using the path name in the system call provided by OS as a standard as information for decision making. Therefore, it is possible to perform readout by the method satisfying the request made by a program (application) without newly providing a means for transmitting information indicating which read operation is expected with respect to the file system.

In the above embodiment, the explanation has been made by citing two programs which are "Samba" and "ftpd" as examples, however, the present disclosure is not limited to the above. It is possible to perform readout by the optimum method with respect to other various applications by forming algorithms corresponding to respective applications. The number of programs is not limited to two.

The example in which the reproducing device according to the embodiment of the present disclosure is applied to the reproducing device which performs only reproduction has been cited, however, it is possible to apply the embodiment of the present disclosure to a recording/reproducing device which can also perform recording.

The present disclosure can be implemented as the following configurations.

(1) A reproducing device including
a storage unit in which data is accumulated,
a program control unit controlling a first program generating an acquisition request of the data accumulated in the storage unit and a second program generating the acquisition request of the data accumulated in the storage unit, which is different from the first program, and
a read control unit managing the data accumulated in the storage unit on a file basis, selecting any one of a first algorithm in which the file is read using a method suitable for reading the data by the first program and a second algorithm in which the file is read using a method suitable for reading the data by the second program based on storage position information of the file designated in the data acquisition request when the data acquisition request is inputted from the program control unit, and performing readout of the data from the storage unit based on the selected first or second algorithm.

(2) The reproducing device described in (1),
in which the data acquisition request is performed by a system call provided as a standard by an operating system.

(3) The reproducing device described in (1) or (2),
in which the storage position information of the file is a path name in which a path to a storage position of the file is written.

(4) The reproducing device described in (1) to (3),
in which the first program indicates continuous readout of the data accumulated in the storage unit from a given address and the second program indicates readout of the data accumulated in the storage unit from a designated specific address.

(5) The reproducing device described in (4),
in which the read control unit sets an amount of the data read out from the storage unit to be large based on the first algorithm when the first algorithm is selected, and sets an amount of the data read out from the storage unit to be small based on the second algorithm when the second algorithm is selected.

(6) A reproducing method including
accumulating data,
controlling a first program generating an acquisition request of the accumulated data and a second program generating the acquisition request of the accumulated data which is different from the first program,
managing the accumulated data on a file basis, and
selecting any one of a first algorithm in which the file is read using a method suitable for reading the data by the first program and a second algorithm in which the file is read using a method suitable for reading the data by the second program based on storage position information of the file designated in the data acquisition request when the data acquisition request is inputted, and performing readout of the accumulated data based on the selected first algorithm or the second algorithm.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing device comprising:
    a storage unit in which data is accumulated;
    a program control unit controlling a first program generating an acquisition request of the data accumulated in the storage unit and a second program generating the acquisition request of the data accumulated in the storage unit, which is different from the first program; and
    a read control unit managing the data accumulated in the storage unit on a file basis, selecting any one of a first algorithm in which the file is read using a method suitable for reading the data by the first program and a second algorithm in which the file is read using a method suitable for reading the data by the second program based on storage position information of the file designated in the data acquisition request when the data acquisition request is inputted from the program control unit, and performing readout of the data from the storage unit based on the selected first or second algorithm.

2. The reproducing device according to claim 1,
wherein the data acquisition request is performed by a system call provided as a standard by an operating system.

3. The reproducing device according to claim 2,
wherein the storage position information of the file is a path name in which a path to a storage position of the file is written.

4. The reproducing device according to claim 3,
wherein the first program indicates continuous readout of the data accumulated in the storage unit from a given address and the second program indicates readout of the data accumulated in the storage unit from a designated specific address.

5. The reproducing device according to claim 4,
wherein the read control unit sets an amount of the data read out from the storage unit to be large based on the first algorithm when the first algorithm is selected, and sets an amount of the data read out from the storage unit to be small based on the second algorithm when the second algorithm is selected.

6. A reproducing method comprising:
accumulating data;
controlling a first program generating an acquisition request of the accumulated data and a second program generating the acquisition request of the accumulated data which is different from the first program;
managing the accumulated data on a file basis; and
selecting any one of a first algorithm in which the file is read using a method suitable for reading the data by the first program and a second algorithm in which the file is read using a method suitable for reading the data by the second program based on storage position information of the file designated in the data acquisition request when the data acquisition request is inputted, and performing readout of the accumulated data based on the selected first or second algorithm.

* * * * *